Dec. 22, 1953  K. R. DENNICK  2,663,594
STORAGE BIN UNLOADING APPARATUS
Filed Aug. 26, 1952  2 Sheets-Sheet 1
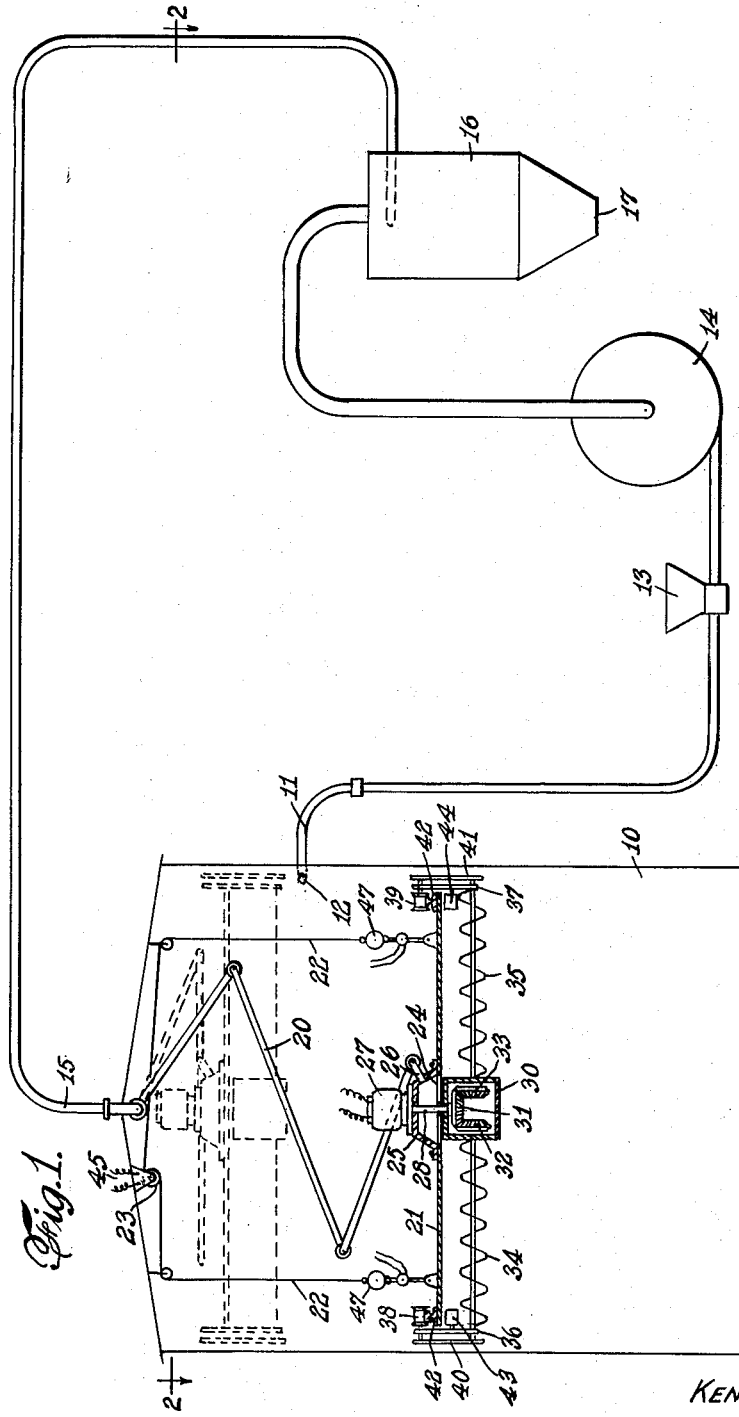
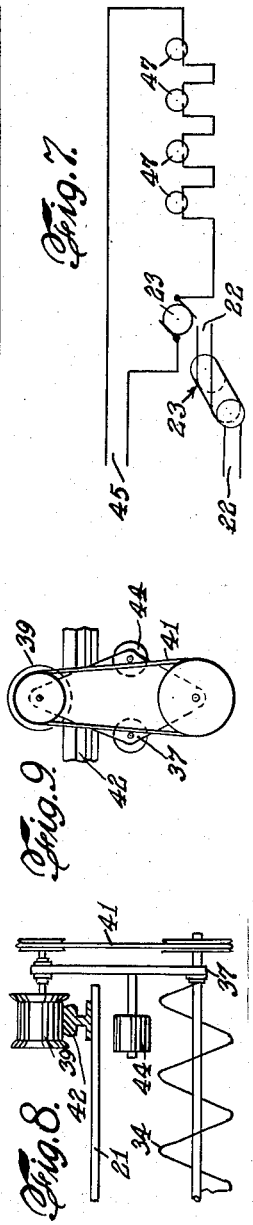
INVENTOR.
KENNETH R. DENNICK
BY
Fred'k F. Schuetz
ATTORNEY

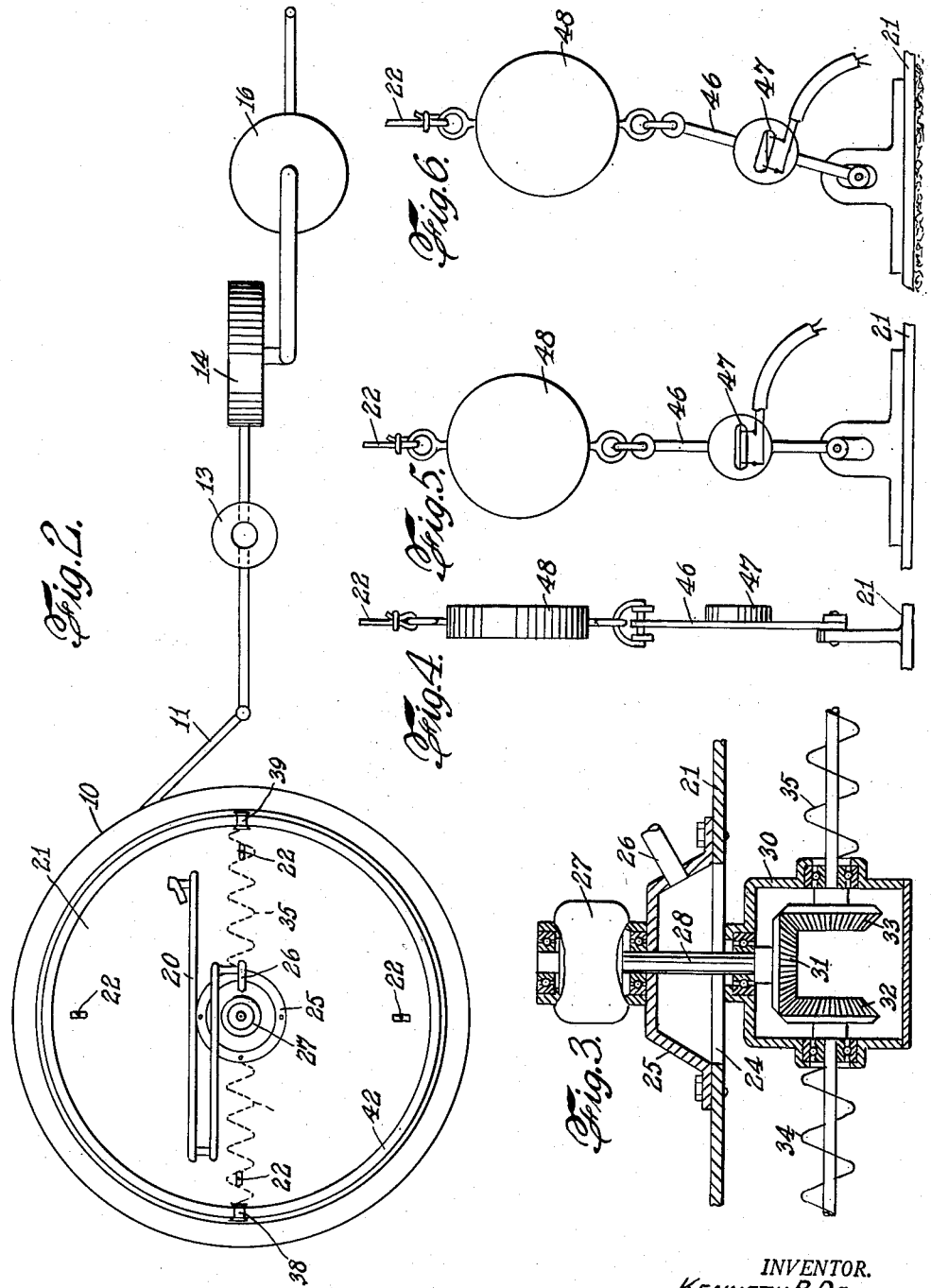

Patented Dec. 22, 1953

2,663,594

UNITED STATES PATENT OFFICE 2,663,594

STORAGE BIN UNLOADING APPARATUS

Kenneth R. Dennick, New York, N. Y.

Application August 26, 1952, Serial No. 306,474

4 Claims. (Cl. 302—50)

1

The invention relates to unloading apparatus, including power-operated means, for the discharge of more or less comminuted material from a material-receiving or cylindrical storage structure or bin therefor. Structures for the storage of such material are provided with means, generally of a pneumatic nature, for the loading of the structure at its upper portion; and the present invention is directed more particularly to means for withdrawing said material through its upper portion by suction withdrawal means.

It has for an object to provide power-operated means whereby the material to be removed is not only broken up but is conveyed automatically to a point in proximity to the said suction withdrawal means.

A further object of the invention is to provide a floating follower top for the contents, said top supporting the power-operated means for advancing the contents to the suction withdrawal means.

A still further object of the invention is to provide means whereby the power-operated conveying means are caused positively to revolve in a plane parallel to the floating follower top and substantially about the vertical axis of the storage structure, as well as under reactive thrust developed in operation of the conveyors.

Another object of the invention is to provide means whereby the floating follower top is maintained at all times in a plane substantially normal to the said vertical axis of the storage structure.

Still another object of the invention is to provide means for interrupting automatically downward power-actuated travel of the follower top when it contacts material within the bin.

In carrying out the invention, a floating platform is provided to top the contents of a pneumatically sealed cylindrical bin, said platform being suspended from a plurality of cables and operated from a hoist motor, the latter under automatic control to interrupt lowering of the platform when the same contacts the top of the contents. Provision is made, also, to operate a pair of oppositely rotating helical or ribbon screw conveyors carried by the platform at its underside, said conveyors extending radially in opposite directions from the vertical axis of the bin to convey material, when they contact the same, toward a central opening in the platform. At this point a gaseous conveying medium conveys the material from the bin through a suitable articulated suction tube having its one end pivoted at the upper surface of the platform

2 and the other end to the top of the bin. Further tubing or duct means convey it thence to a collector for separation and disposal, the conveying medium passing to a blower suction means and feed line, including a feed hopper, back to the interior of the bin for loading of the same with the desired material from said hopper.

As soon as the platform in its descent contacts the introduced material, one or more of the suspending cables becomes slack as its feed continues and an introduced mercury or tilting switch included in the corresponding cable is tilted sufficiently to interrupt an electrical circuit controlling the hoist motor operation.

A further motor carried by the platform serves to actuate the conveyors which are supported in a gear housing located immediately below the centrally disposed suction opening of the platform and carried by the shaft of said further motor.

In order to insure engagement of said conveyors with the upper portion of the loaded material of said bin, irrespective of the angular location of said conveyors, the latter are designed for revolution also about the vertical axis of the bin (shaft of motor driving the conveyors) and to this end a pair of brackets extend upwardly over the platform between its circumference and the inner surface of the bin. At the top, said brackets carry respective rollers which are driven from the spindles of the corresponding conveyors, and the said rollers are designed to ride upon a circular track secured along the circumference of the top surface of said platform, further rollers being carried by the respective brackets below the platform and displaced slightly therefrom so that when either or both of the spindles of the conveyors are bent slightly upwardly through contact with a raised surface portion of the contents, the contact between such upper roller or pair of rollers and the top of the platform is lost and a corresponding lower roller or pair of rollers contacts the underside of the platform as a stop. Thereupon the conveyors proceed to advance material toward the platform opening and also tend to revolve, together with their housing, about the motor spindle as an axis under the reactive thrust developed. In case a blank zone should be encountered by the conveyors, they would drop slightly to place the upper rollers in engagement with the circular track and drive the housing with conveyors angularly until material is engaged.

The nature of the invention, however, will best be understood when described in connection with the accompanying drawings, in which:

Fig. 1 is a part vertical section and diagrammatic representation of the novel bin or silo unloading system, as well as of a conventional loading arrangement.

Fig. 2 is a horizontal section, taken on the line 2—2, Fig. 1 of the drawings, and looking in the direction of the arrows.

Fig. 3 is a detail fragmentary view in vertical section illustrating the conveyor mounting and driving mechanism, together with discharge outlet for material delivered thereto by the conveyors.

Figs. 4 and 5 are fragmentary end and front elevations, respectively, and on an enlarged scale, of a portion of the floating follower top for contents of the bin, suspending cable and included electrical circuit control means; and Fig. 6 is a view similar to Fig. 5 and illustrates the switch action upon introduction of slack in said cable.

Fig. 7 is a diagrammatic representation illustrating the series-arranged cable switches and motor-operated winch for the follower top.

Figs. 8 and 9 are fragmentary front and side elevations respectively and on an enlarged scale of the platform-conveyor revolving means.

Referring to the drawings, a cylindrical storage bin or silo 10 of conventional type is provided to receive comminuted material, the latter being pneumatically introduced through an inlet tubing 11 having a tangentially directed opening 12 along the inner surface of the bin wall. Material to be stored is supplied through a hopper 13 under the action of a blower 14 in the conventional manner. The instant invention is concerned more especially with the withdrawal of the material from the bin, which is effected through the top of the latter by means of a tubing or duct 15 connected thereto and with the suction end of blower 14, after first passing through a collector 16. The latter is connected with the suction end of the blower for separation of the gaseous conveying medium from the material, which is discharged through the mouth 17 of the collector, as is well understood. Within the bin the tubing 15 connects with an articulated section 20, the upper end of the same being pivoted to the tubing 15.

In accordance with the invention, a platform or floating follower top 21 is suspended through cables 22 for vertical movement within the bin, more or less sealing the portion above the platform from the portion below the same. An electric-motor-operated winch 23 is provided at the top of the bin for releasing and winding the cables 22 in manner hereinafter set forth and to cause the platform to follow the level of the contents of the bin.

At its central portion the platform is provided with a circular outlet opening 24 for the contents of the bin, and to this end a housing 25 is secured thereover and is provided with an outlet 26 pivoted to the innermost end of the articulated section 20. The housing supports also an electric motor 27 designed to rotate a shaft 28 passing downwardly through the opening 24 and substantially in the vertical axis of the bin. Its inner end passes through a gear housing 30 carried by said shaft 28, the said shaft within the housing driving a bevel gear 31 which in turn drives two oppositely disposed bevel gears 32 and 33, respectively. The latter are secured to the inner ends, respectively, of ribbon screw conveyors 34 and 35 which extend radially outwardly in opposite directions substantially to the wall of the bin.

These conveyors are designed to advance the material inwardly toward the suction opening 24 from which it is picked up by the articulated section 20 for delivery through tube 15 and discharge as hereinbefore set forth. Advantage is taken of the more or less inherent flexibility of the relatively long spindles for the respective conveyors to control a positive angular movement of said conveyors about the vertical axis of the bin, as will hereinafter be more fully set forth.

In accordance with the drive arrangement for these conveyors, it will be understood that when the same engage material within the bin, the reactive thrust developed will effect a rotation of the conveyor structure in a substantially horizontal plane about the vertical axis of the bin. In the event, however, that the platform should locate the conveyors in a blank zone (free of material), provision is made for rotating positively in a horizontal plane the said conveyors. This is effected by providing at the respective outer ends of the conveyor means supporting brackets 36 and 37 for the conveyor spindles, said brackets extending upwardly over the top of the platform 21 and bearing respective rollers 38 and 39. These are then positively driven as through belts 40 and 41, respectively, operated from the corresponding ends of the conveyor spindles. Rollers 38 and 39 are designed normally to ride upon a circular track 42 secured substantially at the circumference of the top of platform 21 and will thus swing the conveyors angularly until they encounter material.

It will be understood that the design is to be such that the speed at which the conveyors are revolved will be less than that resulting from their reaction when conveying material. When conveying is effected simultaneously by both, the resulting bending of their respective spindles will cause entire disengagement of the rollers 38, 39 to interrupt the drive over on track 42. Additional rollers 43, 44, carried also by the respective brackets 36, 37 but below platform 21, then engage its under surface as a stop to limit the degree of deflection of said conveyor spindles.

Provision is made, also, to then interrupt automatically the descent of the platform, this being effected by interrupting the circuit 45 to the motor for the electrically-operated winch 23. To this end, there is provided in each of the cables 22, as through the interposition of a link 46, a mercury or like tiltable switch 47, all switches being connected in series with the motor circuit 45 as is indicated in Fig. 7 of the drawings. In addition, each cable includes a weight 48 designed to maintain taut the cable portion above the corresponding switch.

It will be understood then that when the platform (conveyors) makes contact with material within the bin, further feeding of the cables will effect a slack portion therein, causing the same to deflect, as is indicated in Fig. 6 of the drawings, and thereby tilting the switch member interposed between the platform and weight to a position to interrupt the circuit. As hereinbefore set forth, a plurality of these switches with cables are disposed circularly around the bin in order to cause the interruption of descent at various angular locations of the material within the bin; and if the conveyors should then not register with this particular location or zone, they will eventually be automatically swung into contact with the material, as hereinbefore set forth.

I claim:

1. In apparatus for the unloading of a sealed cylindrical storage bin for a pneumatically loaded mass of comminuted material, said bin being associated with means to charge the same with the material and having a circular platform vertically movable and floating therein to top and to follow the level of the bin contents, together with cables suspending said platform, and means for releasing and winding the cables to lower and to elevate said platform; material discharge means associated with said platform including an articulated-elbow suction tube having its ends within the bin flexibly connected respectively to the top of the cylindrical bin and substantially centrally with respect to the platform, which latter is provided in its vertical axis with an opening into the bin communicating with the platform end of said suction tube; motor means supported by the platform coaxially with respect to the opening therein and having a drive shaft extending through the opening; a gear housing supported below said platform by the drive shaft for rotation thereby relatively to said platform and about said vertical axis; and screw conveyor means for the comminuted material, rotatably mounted by the housing and extending radially therethrough at the underside of the platform, gearing within the housing and driven by said motor shaft to rotate in opposite directions the conveyor means, said housing adapted for rotation with the conveyor means about said longitudinal axis under the reactive thrust developed by the latter, and said conveyor means in action being adapted to direct the comminuted material radially to the platform opening to concentrate the same in proximity to the platform end of the elbow suction tube for discharge through the latter.

2. Apparatus according to claim 1, wherein a housing is provided on the platform over the axial opening therein for the motor means, the upper portion of said housing being in communication with the suction tube.

3. Apparatus according to claim 1, wherein an electric motor-operated winch is provided to release and wind the cables, the latter including tensioning means and electrical switching means connected in series with the power supply to said motor whereby, when a cable is slacked, the position of the corresponding switching means interrupts automatically the electrical circuit of the motor power supply.

4. Apparatus according to claim 1, wherein arms extend upwardly from the outer ends of the conveyor means and afford bearings therefor, a circular track is secured substantially at the circumference of the platform, and respective rollers are supported at the upper end of each of the said arms, means are provided to rotate the same, and the said rollers are adapted to ride initially upon said track, and lower, freely operating rollers are supported by the respective arms below the platform, the distance between the respective bearing surfaces of a pair of upper and lower rollers being slightly greater than the distance between the bearing surface of the track and the under face of the platform whereby when contact is established between the conveyors and contents of the bin the upper rollers lose contact with said track.

KENNETH R. DENNICK.

References Cited in the file of this patent

UNITED STATES PATENTS

| Number | Name | Date |
|---|---|---|
| 2,580,306 | Leach | Dec. 25, 1951 |